United States Patent [19]

Ozga

[11] 4,079,455
[45] Mar. 14, 1978

[54] MICROPROCESSOR ARCHITECTURE

[75] Inventor: Stanley Edward Ozga, Willingboro, N.J.

[73] Assignee: RCA Corporation, New York, N.Y.

[21] Appl. No.: 749,994

[22] Filed: Dec. 13, 1976

[51] Int. Cl.$^2$ .............................................. G06F 1/00
[52] U.S. Cl. ................................................ 364/200

[56] References Cited

U.S. PATENT DOCUMENTS

| | | | |
|---|---|---|---|
| 3,748,649 | 7/1973 | McEowen et al. | 364/200 |
| 3,757,308 | 9/1973 | Fosdick | 364/200 |
| 3,896,418 | 7/1975 | Brown | 364/200 |
| 3,962,682 | 6/1976 | Bennett | 364/200 |
| 3,980,992 | 9/1976 | Levy et al. | 364/200 |
| 3,984,813 | 10/1976 | Chung | 364/200 |
| 3,988,717 | 10/1976 | Kisylia | 364/200 |

*Primary Examiner*—Gareth D. Shaw
*Assistant Examiner*—Thomas M. Heckler
*Attorney, Agent, or Firm*—H. Christoffersen; Samuel Cohen; Carl M. Wright

[57] ABSTRACT

Two-unit architecture for a microprocessor having one unit to execute program instructions and another unit to fetch the instructions in their proper sequence, being arranged to permit the overlap of fetch and execute cycles to increase program execution speed. Each unit includes a register array for storing operands or addresses, each array having two independent read ports and two independent write ports. In the execution unit, the register array stores operands, read from a memory by the fetch unit, which are applied to an arithmetic-logic unit (ALU), and stores the result from the ALU. In the fetch unit, the array is used to store indirect addresses, which can be incremented or decremented in an adder.

5 Claims, 5 Drawing Figures

MICROPROCESSOR ARCHITECTURE

The Government of the United States has rights in this invention pursuant to Contract No. DAAB07-75-C-1314, awarded by the Department of the Army.

This invention relates to the structural organization of microprocessors having overlapped fetch and execute cycles.

A microprocessor is a device capable of performing arithmetic, logical, and decision-making operations under the control of sequential instructions, but of small size, and usually manufactured as one or two integrated circuits. The instructions are stored in some type of associated memory device. The microprocessor is capable of communicating with a set of peripheral device by means of some well-defined bidirectional interface structure. The operation of a microprocessor is sometimes slow when compared to large computing devices, but microprocessors have the advantage of being implementable on a few integrated circuit chips and of being relatively inexpensive.

Large scale integration techniques have made it possible to produce a small space logic circuits which formerly required thousands of discrete devices. When data processing and electronic computer systems are reduced to a few LSI circuits, the organization is usually a scaled down version of a large scale data processing system. One of the problems encountered when putting a data processing system on a few integrated circuits is the limitation on the number of external connections that can be made to the integrated circuit. Another problem is that programs run slower because of inherent speed limitations due to implementing technology or because basic instructions are used, requiring more instructions to accomplish a task than those used in larger machines.

It is desirable to many systems to increase the speed of program execution. One way is to overlap instruction fetch time with execution time. This has been done in some large systems such as the System 370/195 (IBM), but the techniques used in those systems are not suitable for microprocessors.

The invention is an architecture for a microprocessor, used with a program memory and a data memory, both memories having an address bus and a data bus, the microprocessor having a data execution unit and an instruction fetch unit. Each unit includes a register array, each array having two independent read ports and two independent write ports. The execution unit also has an arithmetic-logic unit for performing operations on operands stored in registers in its register array and gating the results to the data bus of the data memory. There is also a control unit having an instruction register to store the instruction being executed and timing circuits to supply control signals to execute the current instruction.

Figure 1:
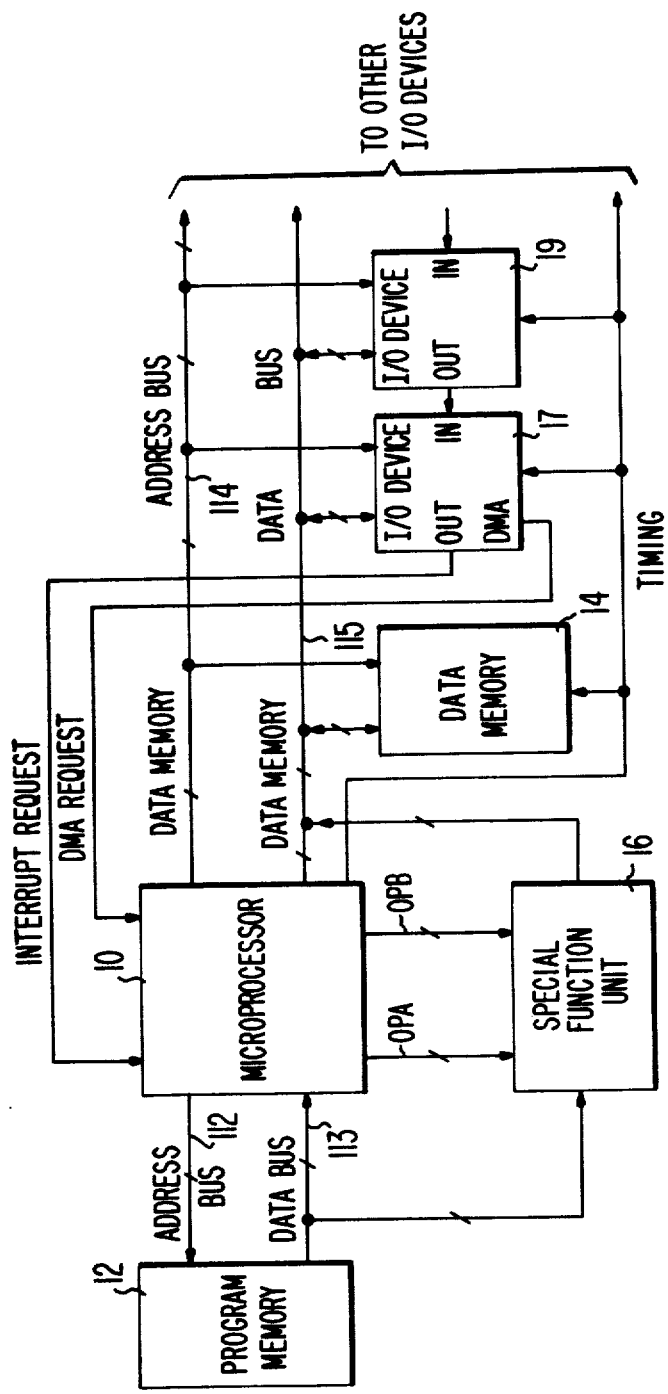
FIG. 1 is a block diagram of a system in which the invention can be used.

A block diagram of the interconnection of a microprocessor according to the invention with the other components of a system is illustrated in FIG. 1, which shows connections made between the microprocessor 10 and a program memory 12, a data memory 14, a special function unit 16, and input/output (I/O) devices 17 and 19. Also shown are the connections for programs interrupt request and direct memory access (DMA) request signals. The connection to the program memory 12 is made via a program memory address bus 112 and a program memory data bus 113. The program memory address bus 112 couples the address signals from the microprocessor 10 to the memory 12. The program memory data bus 113 transmits the program instruction word from the memory 12 to the processor 10 and to the Special Function Unit 16, if used. The illustrative instruction word in the preferred embodiment is 24 bits wide.

Connections to the data memory 14 are made via a data memory address bus 114 and a data memory data bus 115. The data memory address bus 114 couples the data memory address from the microprocessor 10 to the data memory 14 for accessing data storage locations; it also couples certain address combinations for I/O device selection for data transmission and for controlling the I/O devices. Although the direct address space, i.e., the total locations specifiable by the address register, for the system of FIG. 1 is based on the data memory address word-length, parts of this address space, i.e., certain addresses, are shared with I/O devices. This sharing may be done in any manner desired, but for illustrative purposes, the most significant (highest value) addresses are reserved for the I/O device addresses and the remainder are used for addressing the data memory. This arrangement appears to work best for microprocessor configurations having data memory address word-lengths of 16 bits or more.

The data memory data bus 115 is used for bidirectional signal flow to and from the microprocessor 10, the data memory 14, and the I/O devices 17 and 19, and for unidirectional signal flow from the output terminals of the special function unit 16, if used. The microprocessor 10 controls all data transfers over these lines by transmitting to all units connected to these lines operation control signals and timing information.

The microprocessor 10 has facilities for a direct memory access channel. Data transfers and addressing for the channel are handled via the data memory data bus 115 and address bus 114, respectively. The request for a data transfer cycle is communicated to the microprocessor 10 from the I/O device 17 by a DMA request signal. This signal causes the microprocessor to suspend temporarily its normal sequential execution of program instructions or program interrupt handling to perform the control operations associated with the direct memory access channel. The microprocessor 10 includes sequencing logic in the execution unit thereof to decrement and to test for zero the contents of a General Register 0 (GR0), which serves as the word count associated with the DMA channel. When GR0 is decremented to zero, a transfer complete signal is generated to terminate the DMA channel operations. The Address Register 0 (AR0) in the instruction fetch unit of the microprocessor is the DMA data address (pointer) and is incremented automatically after each direct memory access cycle.

Provision is made to connect a special function unit 16 to the microprocessor 10. Two operands fetched from the microprocessor's general registers are coupled to the special function unit 16 through an operand port A (OPA) and an operand port B (OPB) in parallel. The result from the special function unit 16 is returned to the microprocessor 10 via the data memory data bus 115, synchronously or asynchronously. The instruction to be executed in the special function unit 16 is coupled directly thereto from the program memory 12 while the instruction is also being sent to the microprocessor 10. Several of the operation codes are dedicated to the use of the special function unit 16, and the assignment of these codes can be uniquely fixed.

Program controlled I/O devices 17 and 19 are connected to the microprocessor 10 by the data memory address bus 114 and data memory data bus 115. Device addresses are sent from the microprocessor 10 to the I/O devices on the data memory address bus. As described above, the highest order addresses are used to address the I/O devices. Data transfers over the data memory data bus 115 are used for routing data among the I/O devices, the microprocessor 10, the data memory 14, and the special function unit 16 (if used) on a time-shared basis.

Program interrupts can be initiated at the microprocessor 10 by any device supplying an interrupt request signal on the single interrupt request line. The devices' request signals are ORed to this line. Once received by the microprocessor 10, the program interrupt is interpreted and each interrupting device is serviced individually by special routines.

Figure 2:
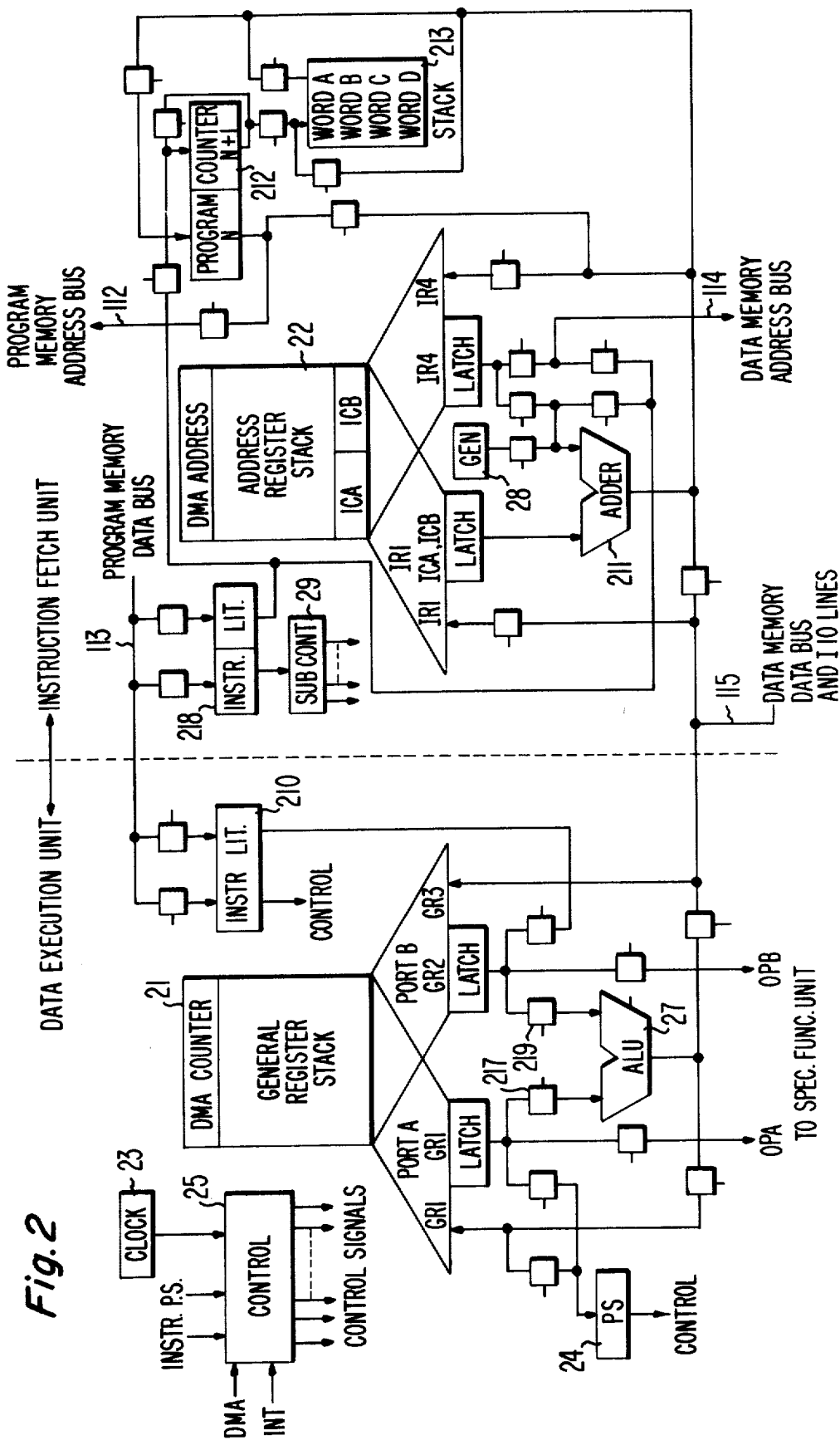
FIG. 2 is a block diagram of the microprocessor architecture embodying the invention.

As shown in the block diagram of FIG. 2, the microprocessor comprises two functional units, the data execution unit and the instruction fetch unit. (The word "instruction" is used herein to denote the operation mode together with its associated operands or operand addresses.)

The data execution unit performs arithmetic and logical operations defined by an instruction repertoire. All the operations performed in this unit have operands taken from a general register array or stack 21, an immediate operand from the instruction word stored in a literal register 210, or hard-wired literal. The operations are register-to-register oriented with the result being stored in one of the selected registers of the stack or transmitted over the data memory data bus 115 to the I/O devices, data memory 14, or the instruction fetch unit. The main architectural features of the data execution unit include the arithmetic-logic unit 27 and the general register stack 21.

The arithmetic-logic unit (ALU) 27 performs all the arithmetic and logical operations that can be specified by the instruction repertoire. Shift, iterative multiply, and iterative divide instructions can be performed using a one-bit shift left or shift right capability included at the ALU output terminals. (For an example of a suitable ALU device, see IC type SN74181 (Texas Instruments, Inc.).)

The general register stack 21 is for illustrative purposes a quad-port eight-word, scratchpad memory used for arithmetic operand storage. Operands for the ALU 27 are available simultaneously on two read ports. Both read ports include latches and are independent from each other; each port can supply the contents of any one of eight general registers in the stack 21 for the arithmetic operations. The register to be read is specified by an operand designation field in the instruction word. There are also write ports for writing data into one of the general registers from the output of the ALU and for writing data into another general register from the data memory data bus 115. The write ports are independent and can be used simultaneously or singly under program control. This permits register-to-register arithmetic operations to be overlapped with data memory-to-register operations. The output signals from the general register stack latches can be transmitted over the operand A and operand B lines for use by the special function unit as described above.

The instruction fetch unit controls the instruction sequencing and data memory accessing. It includes the indirect addressing register array or stack 22, the address update adder 211, the instruction program counter 212, and the program counter stack 213. The address register stack 22 is a quad-port, eight-word scratchpad memory used for indirect address storage. Indirect addresses stored in the stack are selected by an instruction field. The contents of the selected address registers are gated through a read port $IR^4$ to a latch and coupled to the data memory address bus 114, permitting data memory accessing to occur simultaneously with the arithmetic operations being performed in the data execution unit. Direct memory addressing is also permitted in the microprocessor, the addresses coming directly from the immediate operand of the program instruction word. Indexed addressing can be accomplished in a two-instruction sequence explained below. The address register 7 (AR7) differs from the other address registers in that it serves as two iteration counters. Iteration counter B (ICB) is the least significant half of AR7 and iteration counter A (ICA) is the most significant half.

The address adder 211 updates as required the addresses that are used on the data memory address bus 114. The address update, specified in the program instruction word, occurs during the data memory access time, and the updated address is written back into the selected address register at the end of the instruction execution cycle. The address can be updated by $+1$, $+2$, $+3$, or by a variable stored previously in another address register.

Indexed addresses can be calculated using the address adder 211. The base address, which appears as an immediate operand in the program instruction word, is added to the contents of a selected address register. The result is written into a reserved address register (AR6). The next instruction uses the calculated indexed address in AR6 to fetch the contents from the desired data memory location. The stack addressing is not shown in FIG. 2 for purposes of clarity. The register addresses are fields in the instructions and, in the illustrative example, comprise three bits to address one of eight registers.

Figure 3:
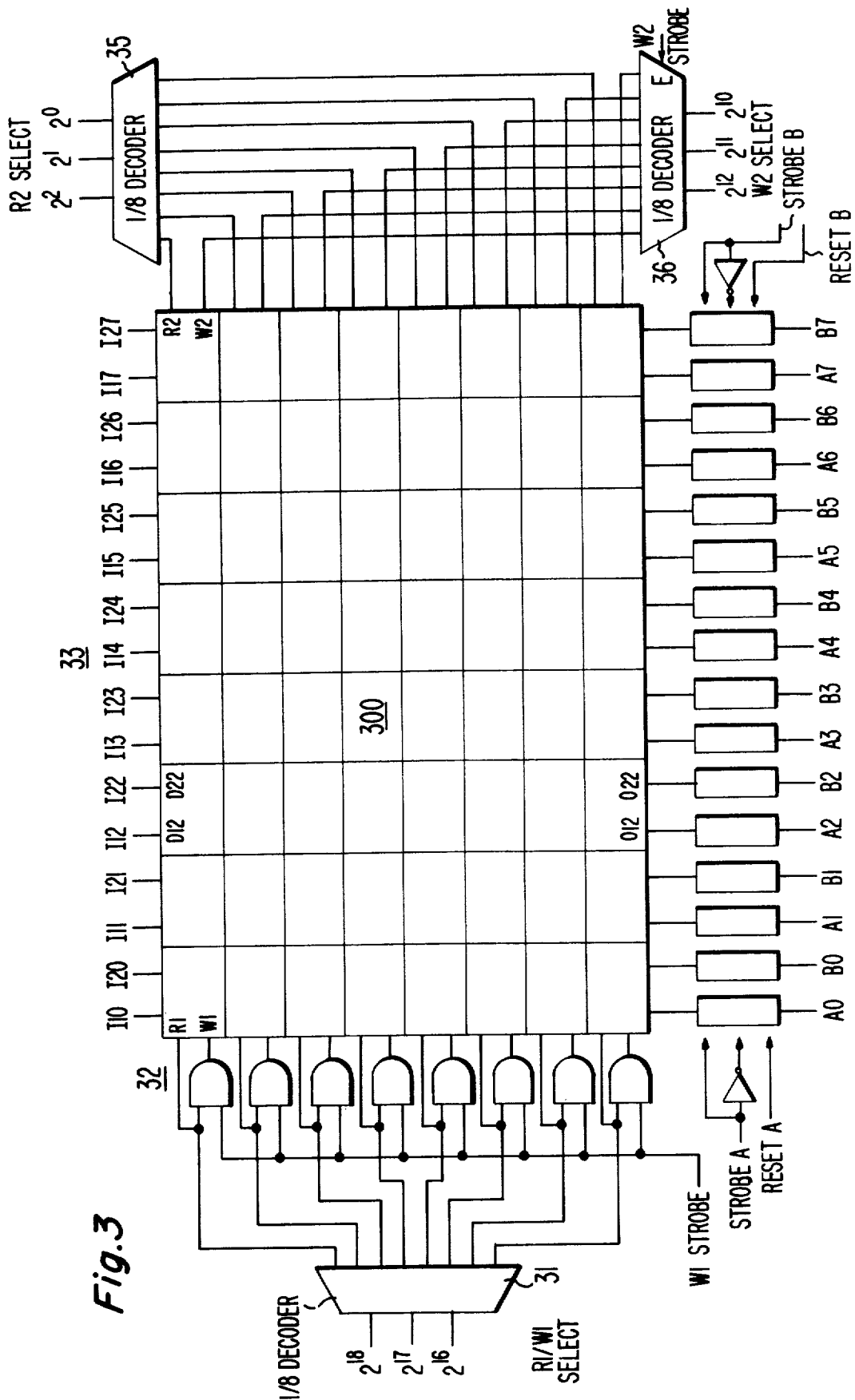
FIG. 3 is a logic diagram of a memory configuration useful in the invention.

FIG. 3 shows a memory arrangement useful as a register stack in the preferred embodiment of the invention. An array of memory cells 300, each having two data input terminals (typically D12 and D22) and two data output terminals (typically 012 and 022) are controlled by read signals (R1 or R2) and write signals (W1 or W2). The three bits of the instruction field used to address a register, such as for R1, the $2^{18}$, $2^{17}$ and $2^{16}$ bits from instruction register, are applied to a one-out-of-eight decoder 31. Such decoders are well known in the art; see, for example, circuit type ECL 2517 (Texas Instruments, Inc.). Depending on the combination of these bits, one of the eight lines activates an R1 command signal to a selected row of cells comprising the addressed register. One of a group of AND gates 32 is also primed by the one-out-of-eight decoder output signal to write in data appearing on the data input lines 33 identified as I10 to I17 if a W1 strobe signal is applied. The data output signals from the accessed cells are applied to a first group of latches which is set by a strobe A signal. The cells in the array can also be addressed by a one-out-of-eight decoder 35 which generates an R2 memory read command signal depending on the R2 select code gated from the $2^{15}$, $2^{14}$ and $2^{13}$ bits of the instruction register. The output signals from the cells are stored in a second group of latches in response to a strobe B signal.

The W2 write address for the cells is supplied by a third one-out-of-eight-decoder 36 which is enabled by the W2 write stobe signal. The W2 select signals are taken from the appropriate field of the instruction, such as bits $2^{12}$, $2^{11}$, and $2^{10}$. The information to be stored appears on the input lines 33 identified as I20 to I27.

Figure 4:
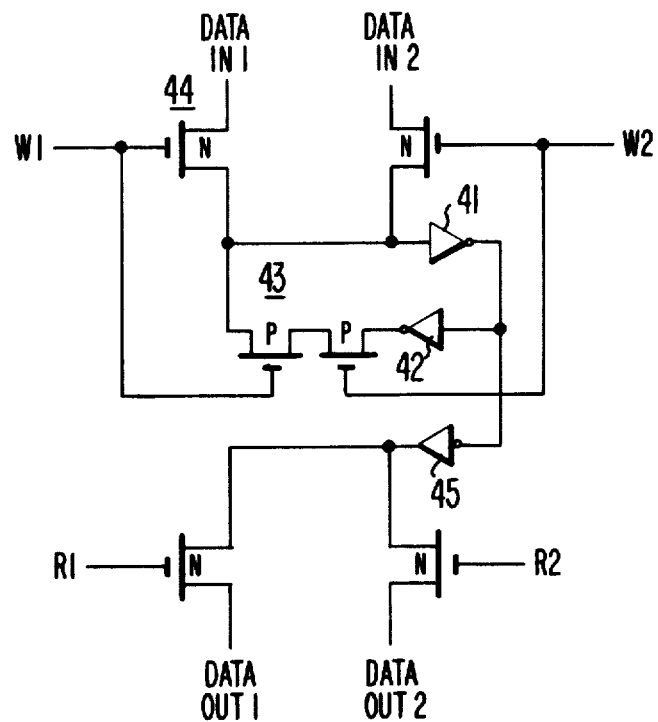
FIG. 4 is a schematic of a memory cell which can be used in the memory configuration of FIG. 3.

A typical memory cell is illustrated in FIG. 4. The W1 signal opens the path coupling two inverters 41 and 42 by turning off a p-type field effect transistor (FET) 43. The DATA IN 1 signal is coupled to the input terminal of the inverter 41 by an N-type FET 44 which is turned on by W1. When the W1 signal is removed, the FET 44 is turned off and the FET 43 is turned on, the latter completing the loop between inverters 41 and 42 to store the bit value from DATA IN 1. The W2 write command signal operates in the same way as the W1 signal using DATA IN 2 as the data input terminal. An output inverter 45 has its output signal gated by one of two N-type FET's depending on whether an R1 or an R2 read command signal is received.

Figure 5:
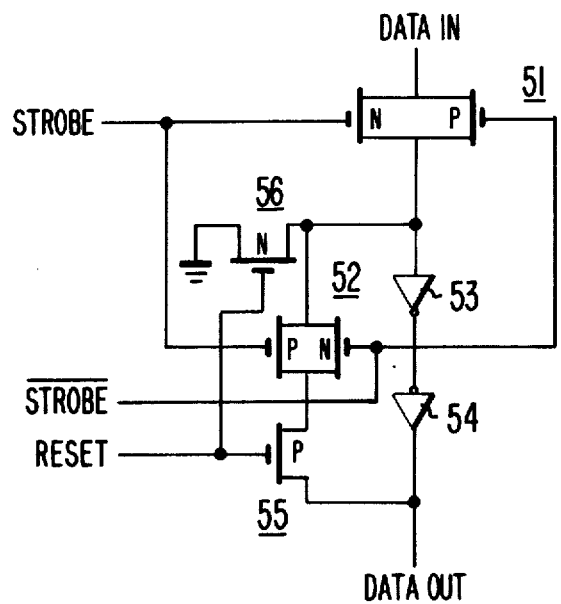
FIG. 5 is a schematic of a latch circuit which can be used in the memory configuration of FIG. 3.

A typical latch circuit is shown in FIG. 5. A transmission gate 51 comprising a pair of transistors is turned on by the application of a strobe signal which also turns off a second transmission gate 52. Opening the transmission gate 52 breaks the feedback path between a pair of inverters 53 and 54, and closing the transmission gate 51 couples the data from the DATA IN terminal to the input of the inverter 53. When the strobe signal is removed, the transmission gate 51 opens and the transmission gate 52 closes completing the path between the inverters 53 and 54, storing the information and providing an output signal indicative thereof at a data output terminal from the inverter 54. A reset signal turns off a transistor 55, which breaks the information feedback loop, and turns on a transistor 56 which couples the input of the inverter 53 to a logical zero signal (ground).

Returning to FIG. 2, the instruction program counter 212 (IPC) is used for instruction sequencing control and may be set with branch addresses. The output signals from the instruction program counter 212 are transmitted over the program memory address bus 112 to access the next instruction during the time arithmetic operations are being performed according to the current instruction in the data execution unit. Branch addresses to the instruction program counter originate either from the immediate operand field of a special instruction class or from the top location of a program counter stack 213, stack word A, as described below.

The instruction program counter stack 213 (IP-STACK) is a four-word, Last-In-First-Out (LIFO) register stack used for processing interrupts, executing subroutines, and performing iterative loop program linkages. Upon linking to a subroutine, the program address linkages are loaded from the instruction program counter into the stack with the previous contents of the stack registers being moved down one location each. The initial contents of the fourth register, stack word D, are lost in this operation. When a return is made from a subroutine, the program address linkages are moved up one location, with the initial content of the first register, stack word A, being placed into the Instruction Program Counter. The final content of the fourth register, stack word D, remains the same as its initial content. The operation of this program counter stack is described in more detail in a copending U.S. patent application, Ser. No. 749,971.

The illustrative instruction word is 24 bits wide and has one of two basic instruction word formats. The first format is designated by the most significant bit ($2^{23}$) of the program instruction word being a logical zero. It has the form:

| | | | Class I. I. Instruction Format. | | | | | |
|---|---|---|---|---|---|---|---|---|
| 23 | 22 19 | 18 16 | 15 13 | 12 10 | 9 7 | 6 4 | 3 0 | |
| 0 | OP CODE | R1 | R2 | R3 | R4 | EXT OP | MODE 3 | |

The second format is designated by the most significant bit of the program instruction word being a logical one and has the form:

| | | Class II. | Instruction Format | | |
|---|---|---|---|---|---|
| 23 | 22 | 19 | 18 16 | 15 | 0 |
| 1 | OP CODE | | R1 | IMMEDIATE OPERAND | |

Output signals from the instruction registers 210 and 218 are used with those from a clock 23 and a program status register 24 to produce timing and control signals from a controller 25. Other input signals to the controller 25 are the DMA and INT request signals. Control signals from the controller 25 are applied to a subcontroller 29 which produces control signals for the instruction fetch unit if the latter is a separate chip or structure.

The control signals are applied to transmission gates which control the signal flow in the units. For example, two transmission gates 217 and 219 couple the A and B operands, respectively, from the read latches of the general register stack 21 when turned on by associated control signals. Other control signals control the ALU 27, the adder 211, and register stack timing.

Given a set of register names and the detailed logic operations to be performed by a machine, a person of ordinary skill in the computer art can configure a controller to accomplish the execution of the instruction repertoire. There are even some computer programs written to perform this task. See, for example, *Digital Systems: Hardware Organization and Design*, F. J. Hill and G. R. Peterson, John Wiley and Sons (New York, 1973); *A Programming Language*, K. E. Inverson, John Wiley and Sons (New York, 1962); and *Digital System Principles*, H. Hellerman, McGraw-Hill (New York, 1967).

The operations are sometimes coded in a special symbolic language for ease of use by the designer or design program. One such language is AHPL described in the above references. The symbols used in this description are listed below.

The primitive operators are ( ≙ means "is defined as"):

+ ≙ binary addition (dyadic);
− ≙ binary 2's complement subtraction (dyadic);
∧ ≙ logical AND (dyadic);

$v$ ≜ logical OR (dyadic);
⊕ ≜ logical Exclusive OR (dyadic); and
— ≜ one's complement (bar) (monadic).
The relational operators are:
= ≜ equal to (dyadic);
≠ ≜ not equal to (dyadic);
< ≜ less than (dyadic); and
: ≜ compare (dyadic-equal length vectors).
The mixed operators are:
← ≜ receives (dyadic);
↑ ≜ shift right one bit (monadic);
↓ ≜ shift left one bit (monadic);
SET ≜ one-bit operand initialized to logical one (monadic);
RST ≜ one-bit operand initialized to logical zero (monadic); and
, ≜ concatenate (dyadic).
Special operators are:
PSH ≜ IPSTACK operation where SWD←(SWC); SWC←(SWB); SWB←(SWA); SWA←specified vector; and
POP ≜ IPSTACK operation where SWA←(SWB); SWB←(SWC); SWC←(SWD).
Identifiers are:
LSB ≜ least significant eight-bit byte of a monadic binary vector;
MSB ≜ most significant eight-bit byte of a monadic binary vector;
Sg ≜ most significant bit of a monadic operand (sign);
$\epsilon$ ≜ binary vector of all logical ones;
$\epsilon^1$ ≜ binary zero vector except least significant bit is one;
$\omega^j$ ≜ least significant $j$ bits of a binary vector; and
$\alpha^j$ ≜ most significant $j$ bits of a binary vector.
The syntax includes:
( ) - when used with a binary matrix, it denotes a specific row or word of the matrix;
- when enclosing an arithmetic expression, it denotes the result of that expression;
- when used with a register name or memory address, it specifies the contents in the register or at the address;
; - separates compound functions; and
IF . . . THEN . . . ELSE . . .
- the expression following IF is evaluated and reduced to a one-bit test quantity; if it is a logical one, the statement following THEN is executed; if it is a logical zero, the statement following ELSE is executed. In some cases, the ELSE statement is not required, e.g., when no action need be taken if the test bit is logical zero.
Some other abbreviations used are:
ARn — the address register specified by the Rn field;
Grn — the general register specified by the Rn field;
DMAB — the data memory address bus;
DM(ARn) — data memory location addressed by the address register specified by the Rn field;
IPC — Instruction program counter;
ICA — Increment Counter A;
ICB — Increment Counter B;
IMOP — Immediate Operand ($2^0$ to $2^{15}$) bits of Class II instructions,
MIM — Master Interrupt Mask bit;
R6A — Register Six of Address stack;
SAAC — set arithmetic condition code;
SLCC — set logical condition code; and
SCCC — set compare condition code.

The R1 and R2 fields of Class I instructions select the two general registers containing the operands to be used in the execution of the accompanying operation. In cases where the result is formed by the ALU 27, the R1 field also specifies the general register into which the result is to be stored. The R3 field selects the general register that is to receive the data that is on the data memory data bus 115 at the time the result of the data execution ALU operation is stored into the register selected by the R1 field. (If the special function unit perfoms the operations, only the data on the data memory data bus is stored in the general register specified by the R3 field.) The R4 field selects one of the address registers for possible use during the instruction execution. The contents from the register selected by the R4 field are transferred onto the data memory address bus 114 at the beginning of the instruction execution cycle to access the data memory 14 or an I/O device during the execution cycle. If the data memory is addressed, the operation to be performed is defined by the contents of the OP CODE and the EXT OP fields. If an I/O device is addressed, the operation to be performed is defined by the address, the I/O device control signals, and the I/O device design.

The program status register 24 (FIG. 2) stores a condition code comprised of four bits. The execution of certain instructions sets or resets the bits, which are used by other instructions for branch decisions. One bit of the condition code is the OV bit which is set by an arithmetic overflow from the ALU 27. Once set, it is reset only by an RSTAT, CSTAT, or LSTAT instruction. Another bit is the C bit which stores the carry out value for certain instructions and is an input bit for other instructions; it operates as the link bit for double precision and shift instructions. An N bit contains the sign of the result of certain operations. The fourth bit of the condition code is a Z bit which is set to indicate that the result of a certain operation was zero and reset to indicate a non-zero result.

Generally, the instructions affecting the condition code are arithmetic (SACC), logical (SLCC), and compare (SCCC). The results of SACC, SLCC, and SCCC are tabulated below;

|   | SACC | SLCC | SCCC |
|---|---|---|---|
| OV | IF $C_n \oplus C_{n-1} = 1$, THEN SET OV. | Not changed. | Not changed. |
| C | IF $C_{n+1} = 1$ THEN SET C. | Not changed. | Not changed. |
| N | IF Sg(Result)=1 THEN SET N ELSE RST N. | If Sg(Result)=1 THEN SET N ELSE RST N. | IF (GR1)<(GR2) THEN SET N ELSE RST N. |
| Z | IF (Result)=0 THEN SET Z ELSE RST Z. | IF (Result)=0 THEN SET Z ELSE RST Z. | IF (GR1)=(GR2) THEN SET Z ELSE RST Z. |

Note: $C_n$ is the carry signal into the sign position and $C_{n+1}$ is the carry signal out of the sign position.

The contents from the selected address register are gated through the address adder 211 and are incremented by 0, +1, −1, +2, −2, or +3 in accordance with the MODE Field. The updated address is written back into the selected address register at the end of the execution cycle.

The EXT OP field contains three bits used to extend the OP CODE field, allowing eight sets of sixteen instructions. The MODE field is used by the instruction fetch unit to control various options of address register updating, instruction program counter successor control, iterative loop control, or instruction program counter stack control. The content of the MODE field is valid for all Class I Instructions except when the EXT OP field contains 110 or 111. The MODE field is ignored in certain instructions transferring information into the address registers. The specific MODE control options with their functional descriptions are detailed in Table I, below:

TABLE I
CLASS I INSTRUCTIONS MODE CONTROL OPTIONS

| MODE FIELD | | | | MODE | |
|---|---|---|---|---|---|
| $2^3$ | $2^2$ | $2^1$ | $2^0$ | Mnemonic | MODE Description |
| 0 | 0 | 0 | 0 | MNOP | DMAB←(AR4) |
| 0 | 0 | 0 | 1 | RTN | DMAB←(AR4);IPC←(SWA);POP. |
| 0 | 0 | 1 | 0 | MINDX | DMAB←(AR4);AR4←(AR4)+(ICB). |
| 0 | 0 | 1 | 1 | AUTP3 | DMAB←(AR4);AR4←(AR4)+3. |
| 0 | 1 | 0 | 0 | AUTP1 | DMAB←(AR4);AR4←(AR4)+1. |
| 0 | 1 | 0 | 1 | AUTM1 | DMAB←(AR4);AR4←(AR4)−1. |
| 0 | 1 | 1 | 0 | AUTP2 | DMAB←(AR4);AR4←(AR4)+2. |
| 0 | 1 | 1 | 1 | AUTM2 | DMAB←(AR4);AR4←(AR4)−2. |
| 1 | 0 | 0 | 0 | RNAP2 | DMAB←(AR4);AR4←(AR4)+2; PROCEDURE A. |
| 1 | 0 | 0 | 1 | RNAP3 | DMAB←(AR4);AR4←(AR4)+3; PROCEDURE A. |
| 1 | 0 | 1 | 0 | RNAP1 | DMAB←(AR4);AR4←(AR4)+1; PROCEDURE A. |
| 1 | 0 | 1 | 1 | RNAM1 | DMAB←(AR4);AR4←(AR4)−1; PROCEDURE A. |
| 1 | 1 | 0 | 0 | RNBP1 | DMAB←(AR4);AR4←(AR4)+1; PROCEDURE B. |
| 1 | 1 | 0 | 1 | RNBM1 | DMAB←(AR4);AR4←(AR4)−1; PROCEDURE B. |
| 1 | 1 | 1 | 0 | RTNA | DMAB←(AR4);PROCEDURE A. |
| 1 | 1 | 1 | 1 | RTNB | DMAB←(AR4);PROCEDURE B. |

PROCEDURE A ≜ IF ICA ≠ 0 THEN (IPC←(SWA); ICA←(ICA)−1); ELSE (IPC←(IPC)+1; POP).
PROCEDURE B ≜ PROCEDURE A with ICA ≜ ICB.

For the extended operation sets 0 or 1, designated by the EXT OP field equal to 000 or 001 respectively, the Class I instructions imply certain register-to-register operations in addition to the operation specified by the contents of the OP CODE field. Extended operation set 0 is such that, at the same time that the arithmetic operation is performed, the data on the data memory data bus 115 is loaded into a general register. Extended operation set 1 is such that the result of the arithmetic operation performed is coupled to the data memory data bus 115. Except when the contents of the R1 and R3 fields are equal, neither of these operations restricts the specifications and performance of the arithmetic operation. For these instructions, the contents of the R1 and R2 fields each specify one of the eight general registers as an operand for the instructions. The contents of the R1 and R2 fields may specify different general registers or may specify the same general register as the sources for the instruction operands. The function specified is performed on the two selected operands, and the result is written into the general register selected by the R1 field. As a result of the selected operation, a condition code status register is set to one of a group of specific condition code settings specified for the operation.

The instructions for the extended operations sets 0 and 1 are detailed in Table II below.

Designating the extended operation set 0 indicates that the general register selected by the R3 field of the instruction is to be loaded with the contents from a location in the data memory or from an I/O device addressed by the address register selected by the R4 field. The load is performed simultaneously with the writing of the result of the specified operation in the general register selected

TABLE II
CLASS I INSTRUCTIONS REGISTER-TO-REGISTER ARITHMETIC-I EXTENDED OPERATION SETS 0 & 1 (EXT. OP=000&001)

| Op Code | | | | Operation | |
|---|---|---|---|---|---|
| $2^{22}$ | | | $2^{19}$ | Mnemonic | Description |
| 0 | 0 | 0 | 0 | ADD | GR1←(GR1)+(GR2);SACC. |
| 0 | 0 | 0 | 1 | ADDL | GR1←(GR1)+(GR2)+C;SACC. |
| 0 | 0 | 1 | 0 | SUB | GR1←(GR1)+($\overline{GR2}$)+1;SACC. |
| 0 | 0 | 1 | 1 | SUBL | GR1←(GR1)+($\overline{GR2}$)+C;SACC. |
| 0 | 1 | 0 | 0 | AND | GR1←(Gr1)∧(GR2);SLCC. |
| 0 | 1 | 0 | 1 | OR | GR1←(GR1)∨(GR2);SLCC. |
| 0 | 1 | 1 | 0 | XOR | GR1←(GR1)⊕(GR2);SLCC. |
| 0 | 1 | 1 | 1 | CPGR | GR1←(GR2). |
| 1 | 0 | 0 | 0 | COMP1 | GR1←($\overline{GR2}$);SLCC |
| 1 | 0 | 0 | 1 | COMP2 | GR1←($\overline{GR2}$)+1;SACC. |
| 1 | 0 | 1 | 0 | ZR | GR1←0. |
| 1 | 0 | 1 | 1 | LP1 | GR1←ε¹. |
| 1 | 1 | 0 | 0 | DECR | GR1←(GR2)+ε;SACC. |
| 1 | 1 | 0 | 1 | LN1 | GR1←ε. |
| 1 | 1 | 1 | 0 | INCR | GR1←(GR2)+1;SACC. |
| 1 | 1 | 1 | 1 | CPGRT | GR1←(GR2);SLCC. | by the content of the R1 field. When the R1 and R3 fields are equal, the load of the general register using the data on the data memory data bus will not occur. Only the result of the operation specified will be loaded into the general register selected by the R1 field.

Designating the extended operation set 1 indicates that the results of the operation is to be stored in the data memory location or the I/O device specified by the address register selected by the R4 field of the instruction. The storing of the result occurs simultaneously with the writing of the result into the general register selected by the R1 field. When the contents of the R1 and R3 fields are equal, the result from the arithmetic operation will be coupled to the data memory data bus, but the result will not be written into the general register selected by the R1 field.

For the extended operation sets 2 or 3, designated by the EXT OP field having 010 or 011, respectively, the Class I instruction OP CODES specify the different operations. Instructions for the extended operation sets 2 and 3 are detailed in Table III below. Designating the extended operation set 2 and 3 causes the same implied loading sequences as specified for extended sets 0 and 1, respectively.

In the extended operation set 4, designated by the content of the EXT OP field being equal to 100, the Class I instructions specify a special set of arithmetic operations. For example, the OP CODES 0000 through 0111 specify operations that do not use the contents of the registers specified by the R3 and R4 fields in an arithmetic operation. Instead, the contents of the condition code status register and the general registers specified by the R1 and R2 fields are used as operands. The contents of the address register specified by the R4 field specifies the address of the data memory location or the I/O device from which data is to be obtained via the data memory data bus and stored in the general register specified by the R3 field. (This operation is performed simultaneously with the arithmetic operation selected.)

With OP CODES 1000 through 1111, the R3 field selects the general register to be used as the destination of the

TABLE III

CLASS I INSTRUCTIONS
REGISTER-TO-REGISTER ARITHMETIC-II
EXTENDED OPERATION SETS 2 & 3 (EXT OP = 010 & 111)

| $2^{22}$ | Op Code | | $2^{19}$ | Operation Mnemonic | Description |
|---|---|---|---|---|---|
| 0 | 0 | 0 | 0 | SHRL | GR1←↑(GR2);Sg(GR1)←0;SLCC. |
| 0 | 0 | 0 | 1 | SHRA | GR1←↑Sg(GR2),(GR2);SLCC. |
| 0 | 0 | 1 | 0 | SHLL | GR1←↓(GR2);$\omega^1$GR2←0:SLCC. |
| 0 | 0 | 1 | 1 | SHRC | GR1←↑(C),(GR2); C←$\omega^1$(GR2);SLCC. |
| 0 | 1 | 0 | 0 | SHLC | GR1←↓(GR2),(C);C←Sg(GR2);SLCC. |
| 0 | 1 | 0 | 1 | DSHL | GR1←↓(GR2),(C);C←Sg(GR2). |
| 0 | 1 | 1 | 0 | INCL | GR1←(GR2)+(C);SACC. |
| 0 | 1 | 1 | 1 | COMPL | GR1←(GR2)+(C);SACC. |
| 1 | 0 | 0 | 0 | SUBN | GR1←(GR1)+(N)+(IF N THEN ($\overline{GR2}$) ELSE (GR2));SACC. |
| 1 | 0 | 0 | 1 | COMPN | GR1←(N) + (IF N THEN ($\overline{GR2}$) ELSE (GR2));SACC. |
| 1 | 0 | 1 | 0 | MPYS | IF C THEN SET TILL; GR1←↑ (IF FILL THEN Sg(GR2)ELSE 0), (IF C THEN (GR1)+(GR2) ELSE (GR1)+0); C←$\omega^1$ ALU;SLCC. |
| 1 | 0 | 1 | 1 | MPYL | GR1←↑(IF C THEN (GR1)+1+($\overline{GR2}$) ELSE (GR1)+0); Sg(GR2)←(IF OV THEN 0 ELSE ALU(n); C←$\omega^1$ALU;SLCC. |
| 1 | 1 | 0 | 0 | DSET | OV←Sg(GR2);N←Sg((GR1)⊕(GR2)); IF (GR1)⊕(GR2)=0 THEN SET Z ELSE RST Z. |
| 1 | 1 | 0 | 1 | STAT | MSB GR1←0, OV,C,N,Z;LSB GR1←0. |
| 1 | 1 | 1 | x | NOP | |

Note: FILL is reset during all instructions except MPYS, MPYL, and SHRC.

arithmetic result. No simultaneous load of data from the data memory or an I/O device is performed. During execution of these instructions, the R1 field specifies a test of the C, N or Z bits of the conditions code status register. Depending on the outcome of the condition code test, all ones or all zeroes are used as one of the input operands to the ALU 27. The other input operand is the contents in the general register selected by the R2 field. The result of the indicated logical operation is stored in the general register selected by the R3 field. Table IV gives a complete functional description of all the instructions in the extended operation set 4.

The RMIM and SMIM reset and set, respectively, the MIM bit which is ANDed with the external interrupt request signal (INT). Using these instructions, the programmer can allow or inhibit interrupts.

In the extended operation set 5, designated by an EXT OP code of 101, the OP CODE operation is performed by the special function unit. The assignment of the sixteen binary combinations of the OP CODE in this extended operation set is wholly a function of the special function device used with the microprocessor. In the execution of these instructions, the R1 field selects the general register whose contents are sent to the special function unit on the operand A (OPA) lines and the R2 field selects the general register whose contents are sent to the special function unit on the operand B (OPB) lines. The result of the SFU operation is gated to the data memory data bus and is written into the general register selected by the R3 field. In these instructions, the MODE field can be used to designate operations to be performed

TABLE IV

CLASS I INSTRUCTIONS
SPECIAL ARITHMETIC INSTRUCTIONS
EXTENDED OPERATION SET 4 (EXT OP= 100)

| $2^{22}$ | OP Code | | $2^{19}$ | Operation Mnemonic | Description |
|---|---|---|---|---|---|
| 0 | 0 | 0 | 0 | ACABS | GR1←(GR1)+Sg(GR2)+(IF Sg (GR2)=1 THEN ($\overline{GR2}$) ELSE(GR2)); SACC. |
| 0 | 0 | 0 | 1 | ABS | GR1←Sg(GR2)+(IF Sg(GR2)=1 THEN($\overline{GR2}$)ELSE(GR2));SACC. |
| 0 | 0 | 1 | 0 | LSTAT | OV,C,N,Z←$\omega^4$ MSB (GR2) |
| 0 | 0 | 1 | 1 | RSTAT | OV,C,N,Z←0 |
| 0 | 1 | 0 | 0 | CMP | GR1;GR2;SCCC |
| 0 | 1 | 0 | 1 | CSTAT | OV,C,N,Z←($\overline{OV, C, N, Z}$) |
| 0 | 1 | 1 | 0 | RMIM | MIM←0 |
| 0 | 1 | 1 | 1 | SMIM | MIM←1 |
| 1 | 0 | 0 | 0 | CFCCO | MSB GR3←IF (R1)Λ(C,N,Z)=0 THEN (εV(GR2)) ELSE (0 V (GR2));SLCC. |
| 1 | 0 | 0 | 1 | CTCCO | MSB GR3←IF (R1)Λ(C,N,Z)≠0 THEN (εV(GR2)) ELSE (OV(GR2)); LSBs GR3←LSBs GR2; SLCC. |
| 1 | 0 | 1 | 0 | CFCCA | MSB GR3←IF (R1)Λ(C,N,Z)=0 THEN (εΛ(GR2)) ELSE (0Λ(GR2)) LSBs GR3←0; SLCC. |
| 1 | 0 | 1 | 1 | CTCCA | MSB GR3←IF (R1)Λ(C,N,Z)≠0 THEN (εΛ(GRs)) ELSE (0Λ(GR2)); LSBs GR3←0; SLCC. |
| 1 | 1 | 0 | 0 | CFCC | MSB GR3←IF (R1)Λ(C,N,Z)=0 THEN ε ELSE 0; LSBs GR3←0; SLCC. |
| 1 | 1 | 0 | 1 | CTCC | MSB GR3←IF (R1)Λ(C,N,Z)≠0 |

TABLE IV-continued
CLASS I INSTRUCTIONS
SPECIAL ARITHMETIC INSTRUCTIONS
EXTENDED OPERATION SET 4 (EXT OP=100)

| OP Code $2^{22}$ | | | $2^{19}$ | Operation Mnemonic | Description |
|---|---|---|---|---|---|
| | | | | | THEN ε ELSE 0; LSBs GR3←0; SLCC. |
| 1 | 1 | 1 | 0 | DIVC | TEMP←(IF N THEN (GR1)+(GR2) ELSE (GR1)+(GR2)+1); IF Sg(TEMP)=OV THEN SET C ELSE (TEMP←(GR1); RESET C);GR1←(TEMP); IF (TEMP) = 0 THEN SET Z ELSE RST Z; SACC (C and Z only). |
| 1 | 1 | 1 | 1 | DIVT | TEMP←(IF N THEN (GR1)+(GR2) ELSE (GR1)+($\overline{GR2}$)+1); IF (TEMP)+0 THEN SET Z ELSE RST Z; IF Sg(TEMP)OV THEN SET C ELSE RST C; SACC(C and Z only). |

(TEMP is a temporary buffer for the DIVC and DIVT instruction and is not a physical machine register.)

simultaneously on the contents of the address register selected by the R4 field.

In the extended operation set 6, designated by an EXT OP code of 110, the operations performed are data execution unit to instruction fetch unit communication. In these instructions, the MODE field is not used to specify simultaneous operations and all data memory, I/O device, and special function unit communications are inhibited since the data memory data bus is used as the link between the two functional units. The instruction format is a three-address instruction in which the R1 and R2 fields select the contents of general registers as operands, the OP CODE selects the arithmetic function to be performed by the ALU 27, and the R4 field selects an address register as the designation of the ALU operation result. Alternatively, the ALU result is stored in the general register selected by the R1 field if the R1 and R3 fields are not equal. Whenever address register 7 is selected as a destination register for the ALU operation result, an automatic program counter stack (IPSTACK) operation occurs. The program counter stack is pushed and the program counter value plus one is loaded into stack word A. (For a machine configuration having more than eight bits in the instruction fetch unit, the OP CODE selects some operations providing byte storage in either the most significant byte or the least significant byte of an address register selected by the R4 field). Table V gives a detailed functional specification for the sixteen operations in the extended operation set 6.

In the extended operation set 7, designated by an EXT OP code of 111, the operations store the contents from an address register or the instruction program counter stack into the general register selected by the R3 field or into the data memory or I/O device addressed by the address register selected by the R4 field. (The information can be stored as whole words, or the most significant byte or the least significant byte may be stored separately).

There are also instructions for loading the program counter stack from the data memory, an I/O device, or from a general register specified by the R2 field. The address register selected by the R4 field specifies the data memory location of the I/O device to be used as the source for the information to be stored. (The program counter stack can be loaded in whole words, or the most significant byte or the least significant byte can be loaded separately.) In this extended operation set, the MODE field with all its control combinations is invalid for all the instructions. Table VI gives the detailed specifications for the instructions in EXT OP 7.

TABLE V
CLASS I INSTRUCTIONS
EXECUTION TO ADDRESS UNIT INSTRUCTIONS
EXTENDED OPERATION SET 6 (EXT OP-110)

| Op Code $2^{22}$ | | | $2^{19}$ | Operation Mnemonic | Description |
|---|---|---|---|---|---|
| 0 | 0 | 0 | 0 | CPGI | AR4←(GR2);PROCESS 1. |
| 0 | 0 | 0 | 1 | CPGIM | MSB AR4←MSB(GR2); PROCESS 1. |
| 0 | 0 | 1 | 0 | CPGIL | LSB AR4←LSB(GR2);PROCESS 1. |
| 0 | 0 | 1 | 1 | CPIR | AR4←AR1. |
| 0 | 1 | 0 | 0 | IADDM | MSB AR4←MSB(GR1)+MSB(GR2); PROCESS 1. |
| 0 | 1 | 0 | 1 | ISUBM | MSB AR4←MSB(GR1)+MSB($\overline{GR2}$)+1; PROCESS 1. |
| 0 | 1 | 1 | 0 | IDECM | MSB AR4←MSB(GR2)+ε;PROCESS 1. |
| 0 | 1 | 1 | 1 | IINCM | MSB AR4←MSB(GR2)+ε;PROCESS 1. |
| 1 | 0 | 0 | 0 | IDECL | LSB AR4←LSB(GR2)+ε$^1$;PROCESS 1. |
| 1 | 0 | 0 | 1 | IADDL | LSB AR4←LSB(GR1)+LSB(GR2); PROCESS 1. |
| 1 | 0 | 1 | 0 | ISUBL | LSB AR4←LSB(GR1)+LSB($\overline{GR2}$)+1 PROCESS 2. |
| 1 | 0 | 1 | 1 | IINCL | LSB AR4←LSB(GR2)+ε$^1$;PROCESS 1. |
| 1 | 1 | 0 | 0 | ISUB | AR4←(GR1)+($\overline{GR2}$)+1;PROCESS 1; SACC. |
| 1 | 1 | 0 | 1 | IINC | AR4←(GR2)+ε$^1$;PROCESS 1;SACC. |
| 1 | 1 | 1 | 0 | IADD | AR4←(GR1)+(GR2);PROCESS 1;SACC. |
| 1 | 1 | 1 | 1 | IDEC | AR4←(GR2)+ ;PROCESS 1;SACC. |

Note: PROCESS 1 Δ IF R1 ≠ R3 THEN (PRECEDING FUNCTION WITH AR4 Δ GR1).

TABLE VI
CLASS I INSTRUCTIONS
ADDRESSING TO EXECUTION UNIT INSTRUCTIONS
EXTENDED OPERATION SET 7 (EXT OP=111)

| Op Code $2^{22}$ | | | $2^{19}$ | Operation Mnemonic | Description |
|---|---|---|---|---|---|
| 0 | 0 | 0 | 0 | PSHG | PSH;SNA←(GR2) |
| 0 | 0 | 0 | 1 | PSHGM | PSH MSB;MSB SWA←MSB(GR2) |
| 0 | 0 | 1 | 0 | PSHGL | PSH LSB: LSB SWA←LSB(GR2). |
| 0 | 0 | 1 | 1 | PSHM | PSH;SWA←(DM(AR4));AR4←(AR4)+ε. |
| 0 | 1 | 0 | 0 | PSHMM | PSH MSB;MSB SWA←MSB(DM(AR4)); AR4←(AR4)+ε. |
| 0 | 1 | 0 | 1 | PSHML | PSH LSB; LSB SWA←LSB(DM(AR4)); AR4←(AR4)+ε. |
| 0 | 1 | 1 | 0 | POPM | DM(AR4)←(SWA);POP;AR4←(AR4)+ε$^1$. |
| 0 | 1 | 1 | 1 | POPMM | MSB DM(AR4)←MSB(SWA);POP MSB; AR4←(AR4)+ε$^1$. |
| 1 | 0 | 0 | 0 | POPML | LSB DM(AR4)←LSB(SWA);POP LSB; AR4←(AR4)+ε$^1$. |
| 1 | 0 | 0 | 1 | CPIG | GR3←(AR1). |
| 1 | 0 | 1 | 0 | CPIGM | MSB GR3←MSB(AR1). |
| 1 | 0 | 1 | 1 | CPIGL | LSB GR3←LSB(AR1). |
| 1 | 1 | 0 | 0 | STIR | DM(AR4)←(AR1). |
| 1 | 1 | 0 | 1 | STIRM | MSB DM(AR4)←MSB(AR1). |
| 1 | 1 | 1 | 0 | STIRL | LSB DM(AR4)←LSB(AR1). |
| 1 | 1 | 1 | 1 | IRADD | AR4←(AR1)+(AR4). |

Class II instructions generally use the least significant 16 bits as an immediate operand. In these instructions, the R1 field specifies either a general register, an address register, or in the case of branch instructions, an extension of the operation code. Sixteen instructions are included in this instruction class with specific operations delineated by the OP CODE field. An automatic program counter stack operation occurs whenever address register 7 is selected as the destination of the operation result. In such cases, the program counter stack is pushed and the program counter is incremented by one and loaded into stack word A. The detailed specifications of Class II instructions are given in Table VII below.

The microprocessor described is one which has an instruction set and hardware especially well adapted to overlap fetch and execute operations. It is especially useful for array processing. The architecture described in detail can be implemented in several ways. Each functional unit can be a separate integrated circuit chip or both units can be constructed together on a single chip. The advantage of the former is that as many integrated circuits as desired can be cascaded to operate on data words or instruction words of any length. The preferred embodiment herein described was considered to have eight bit data words with a 24-bit instruction word. If sixteen data words are to be used, two data execution units with a single instruction fetch unit could be used. The architecture is flexible with regard to system size.

The instruction set described in detail is considered to be only one of several possible sets that could be used in the architecture described. Various modifications to the systems and circuits described and illustrated to explain the concepts and modes of practicing the invention can be made by those of ordinary skill in the art within the principles or scope of the invention as expressed in the appended claims.

TABLE VII
CLASS II INSTRUCTIONS
IMMEDIATE CLASS

| Op Code $2^{22}$ | | | $2^{19}$ | Operation Mnemonic | Description |
|---|---|---|---|---|---|
| 0 | 0 | 0 | 0 | BOT | IF (R1)Λ(C,N,Z)≠0 THEN IPC←IMOP ELSE IPC←(IPC)+ε$^1$. |
| 0 | 0 | 0 | 1 | BOF | IF (R1)Λ(C,N,Z)=0 THEN IPC←IMOP ELSE IPC←(IPC)+ε$^1$. |
| 0 | 0 | 1 | 0 | BRAN | IF (R1)=000 THEN (PSH;SWA←(IPC)+ε$^1$;IPC←IMOP). IF (R1)=001 THEN (IF Z THEN (PSH;SWA←(IPC)+ε$^1$;IPC←IMOP) ELSE IPC←(IPC)+ε$^1$. IF (R1)=011 THEN (IPC←IMOP;POP). IF (R1)=100 THEN(IF OV THEN IPC←IMOP ELSE IPC←(IPC)+ε$^1$). IF (R1)=101 THEN (IF $\overline{OV}$ THEN IPC←IMOP ELSE IPC←(IPC)+ε$^1$). IF (R1)=110 THEN (IF (ICA)≠0 (THEN IPC←IMOP ELSE IPC←(IPC)+ε$^1$) THEN ICA←(ICA)+ε). IF (R1)=111 THEN (IF (ICB)≠0 (THEN IPC←IMOP ELSE IPC←(IPC)+ε$^1$) THEN ICA←(ICA)+ε). |
| 0 | 0 | 1 | 1 | LOAD | GR1←(DM(IMOP)). |
| 0 | 1 | 0 | 0 | ADDI | GR1←(GR1)+IMOP;SACC. |
| 0 | 1 | 0 | 1 | ANDI | GR1←(GR1)ΛIMOP;SLCC. |
| 0 | 1 | 1 | 0 | ORI | GR1←(GR1)VIMOP;SLCC. |
| 0 | 1 | 1 | 1 | XORI | GRL←(GR1)⊕IMOP;SLCC. |
| 1 | 0 | 0 | 0 | CMPI | (GR1):IMOP;SCCC. |

TABLE VII-continued

| Op Code $2^{22}$ | | | $2^{19}$ | Operation Mnemonic | Description |
|---|---|---|---|---|---|
| 1 | 0 | 0 | 1 | SUBI | GR1←(GR1)+IMOP+1;SACC |
| 1 | 0 | 1 | 0 | STORE | DM(IMOP)←(GR1). |
| 1 | 0 | 1 | 1 | LDI | GR1←IMOP. |
| 1 | 1 | 0 | 0 | ILDI | AR1←IMOP. |
| 1 | 1 | 0 | 1 | ILDIM | MSB AR1←MSB IMOP. |
| 1 | 1 | 1 | 0 | ILDIL | LSB AR1←LSB IMOP. |
| 1 | 1 | 1 | 1 | INDX | R6A←(AR1)+imop. |

What is claimed is:

1. A microprocessor for use in a system including program memory means and data memory means, each having address bus means and data bus means, comprising in combination:
   a data execution unit comprising
   general register array means having two access ports for simultaneously reading the contents of two registers from said general array means and two input ports for simultaneously writing in the contents of two registers,
   arithmetic-logic means coupled to receive operands from said access ports of the general register array means for performing selective operations to produce result signals,
   means for coupling said result signals to the data bus means of the data memory means,
   control means, including instruction register means for storing the current instruction being executed and timing means, for supplying control signals to control the execution of said current instruction; and
   an instruction fetch unit comprising
   address register array means having two access ports for simultaneously reading the contents of two registers from said address array means and two input ports for simultaneously writing in the contents of two registers,
   instruction counter means for storing the program memory address of the next instruction to be executed,
   means for coupling said instruction counter means to said program memory address bus,
   data addressing means for coupling the contents of said access ports of the address register array to the address bus means of said data memory means.

2. The invention as claimed in claim 1 wherein said data execution unit further includes means for coupling the data bus means of said data memory means to one of said input ports of the general register array means.

3. The invention as claimed in claim 2 wherein said data addressing means including adder means for modifying the contents of an accessed address register; and
   means for coupling a modified address to one of said input ports of said address register array means.

4. The invention as claimed in claim 3 further including means for coupling a portion of said instruction register means as an operand to said arithmetic-logic means.

5. The invention as claimed in claim 4 further including direct memory access capability comprising:
   DMA request means for initiating a DMA operation;
   DMA addressing means for accessing a predetermined address register in said address register array means as the pointer for data being transferred;
   means for accessing a predetermined general register in said general register array means;
   means for decrementing the value in said predetermined general register;
   means for determining a zero value in said predetermined general register; and
   means responsive to a zero value in said predetermined general register for terminating the DMA operation.

* * * * *

UNITED STATES PATENT OFFICE
CERTIFICATE OF CORRECTION

PATENT NO. : 4,079,455

DATED : March 14, 1978

INVENTOR(S) : Stanley Edward Ozga

It is certified that error appears in the above-identified patent and that said Letters Patent are hereby corrected as shown below:

Column 1, line 38, "to" should be --in--.

Column 3, line 35, "mode" should be --code--.

Column 4, line 19, "$IR^4$" should be --IR4--.

Column 4, line 38, "+1," should be --±1,--.

Column 4, line 39, "+2, +3," should be --±2, ±3,--.

Column 5, line 13, "stobe" should be --strobe--.

Column 6, line 16, "Class I. I. Instruction Format." should be --Class I. Instruction Format--.

Column 7, line 55, "Grn" should be --GRn--.

Column 8, line 11, "perfoms" should be --performs--.

Column 9, lines 47 and 48, "specifications" should be --specification--.

Column 9, line 60, "operations" should be --operation--.

UNITED STATES PATENT OFFICE
CERTIFICATE OF CORRECTION

PATENT NO. : 4,079,455

DATED : March 14, 1978

INVENTOR(S) : Stanley Edward Ozga

It is certified that error appears in the above-identified patent and that said Letters Patent are hereby corrected as shown below:

Column 10, Table II, line 10, under the heading "Description", "GR1←(Grl)∧(GR2);SLCC." should be --GR1←(GR1)∧(GR2);SLCC.--.

Column 10, line 30, "results" should be --result--.

Column 11, Table III, line 18, "TILL;" should be --FILL;--.

Column 11, Table III, line 23, "Sg(GR2)←(IF OV" should be --Sg(GR1)←(IF OV--.

Column 11, line 29, "conditions" should be --condition--.

Column 12, Table IV, line 13, "GR1;GR2;SCCC" should be --GR1:GR2;SCCC--.

Column 12, Table IV, line 14, "OV,C,N,Z←($\overline{OV, C, N, Z}$)¯" should be --OV,C,N,Z←($\overline{OV}, \overline{C}, \overline{N}, \overline{Z}$)--.

UNITED STATES PATENT OFFICE
CERTIFICATE OF CORRECTION

PATENT NO. : 4,079,455

DATED : March 14, 1978

INVENTOR(S) : Stanley Edward Ozga

It is certified that error appears in the above-identified patent and that said Letters Patent are hereby corrected as shown below:

Column 14, Table V, last line, "Note" PROCESS 1 Δ IF R1 ≠ R3 THEN (PRECEDING FUNCTION WITH AR4 Δ GR1)." should be --Note: PROCESS 1 $\underline{\Delta}$ IF R1 ≠ R3 THEN (PRECEDING FUNCTION WITH AR4 $\underline{\Delta}$ GR1).--.

Column 15, Table VI, line 6, "PSH;SNA←(GR2)" should be --PSH;SWA←(GR2)--.

Column 17, Table VII, line 11, "R6A←(AR1)+imop." should be --R6A←(AR1)+IMOP.--.

Signed and Sealed this

Eighteenth Day of July 1978

[SEAL]

Attest:

RUTH C. MASON
*Attesting Officer*

DONALD W. BANNER
*Commissioner of Patents and Trademarks*